United States Patent
Jia et al.

(10) Patent No.: US 9,940,724 B2
(45) Date of Patent: Apr. 10, 2018

(54) METHOD AND SYSTEM FOR DETECTING MULTIPLE MOVING OBJECTS FROM REAL-TIME AERIAL IMAGES

(71) Applicant: Intelligent Fusion Technology, Inc, Germantown, ND (US)

(72) Inventors: Bin Jia, Germantown, MD (US); Kui Liu, Germantown, MD (US); Sixiao Wei, Germantown, MD (US); Erik Blasch, Rome, NY (US); Carolyn Sheaff, Rome, NY (US); Haibin Ling, Cherry Hill, NJ (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 0 days.

(21) Appl. No.: 15/263,761

(22) Filed: Sep. 13, 2016

(65) Prior Publication Data

US 2018/0075605 A1   Mar. 15, 2018

(51) Int. Cl.
*G06K 9/00*   (2006.01)
*G06T 7/11*   (2017.01)
(Continued)

(52) U.S. Cl.
CPC ............. *G06T 7/11* (2017.01); *G06T 7/194* (2017.01); *G06T 1/20* (2013.01); *G06T 2207/10032* (2013.01)

(58) Field of Classification Search
USPC ........................................................ 382/103
See application file for complete search history.

(56) References Cited

U.S. PATENT DOCUMENTS

| 9,082,019 B2 * | 7/2015 | Sheu | G06K 9/00771 |
| 2008/0192116 A1 * | 8/2008 | Tamir | G06T 7/292 |
| | | | 348/157 |

(Continued)

FOREIGN PATENT DOCUMENTS

| CN | 102810250 A | * 12/2012 | G08G 1/01 |
| CN | 105654511 A | * 6/2016 | G06T 7/20 |

OTHER PUBLICATIONS

AFRL: "Columbus large image format (CLIF) 2006", Website. Sep. 13, 2016 <https://www.sdms.afrl.af.mil/index.php?collection=clif2006> pp. 1-2.

(Continued)

*Primary Examiner* — Gregory F Cunningham
(74) *Attorney, Agent, or Firm* — Anova Law Group, PLLC; Wenye Tan; Xiaoqun Wu (57) ABSTRACT

In accordance with various embodiments of the disclosed subject matter, a method and a system for detecting multiple objects from real-time images are provided. The method comprises: performing, using a CPU host, an image segmentation process to divide real-time input images into a plurality of image partitions; performing, by multiple GPUs, a fast block-wise registration process, a mark setting process, a background generation process, a foreground generation process based on a Hyper-Q computation infrastructure, and a support vector machine classification process; and generating, by the CPU host, visualization classification images.

20 Claims, 7 Drawing Sheets

(51) Int. Cl.
*G06T 7/194* (2017.01)
*G06T 1/20* (2006.01)

(56) References Cited

U.S. PATENT DOCUMENTS

2013/0271757 A1* 10/2013 Kang .................... A61B 3/102
356/300
2016/0110885 A1* 4/2016 Blasch ................. G06T 7/2066
382/103

OTHER PUBLICATIONS

Jia, B. et al., "Aircraft ground monitoring with high performance computing multicore enabled video tracking," 2014 IEEE/AIAA 33rd Digital Avionics Systems Conference (DASC), Colorado Springs, CO, 2014, pp. 6B2-1-6B2-9.
Liu, K. et al., "A Cloud Infrastructure for Target Detection and Tracking Using Audio and Video Fusion," IEEE Conference on Computer Vision and Pattern Recognition Workshop, 2015, pp. 74-81.
Liu, K. et al., "A real-time orbit satellites uncertainty propagation and visualization system using graphics computing unit and multi-threading prcessing," IEEE/AIAA 34th Digital Avionics Systems Conference, 2015, pp. 8A2-1-8A2-10.
Liu, K. et al., "Optical flow and principal component analysis-based motion detection in outdoor videos," EURASIP Journal on Advances in Signal Processing, 2010, 2010:680623. pp. 1-7.
Liu, K. et al., "Fast motion detection from airborne videos using graphics processing unit ," Journal of Applied Remote Sensing, vol. 6, No. 1, 2012, pp. 061505-1-061505-14.

* cited by examiner

METHOD AND SYSTEM FOR DETECTING MULTIPLE MOVING OBJECTS FROM REAL-TIME AERIAL IMAGES

GOVERNMENT RIGHTS

This invention was made with Government support under Contract No. FA8750-15-C-0025, awarded by the United States Air Force Research Laboratory. The U.S. Government has certain rights in this invention.

TECHNICAL FIELD

The disclosed subject matter generally relates to object recognition field and, more particularly, relates to methods and systems for detecting multiple moving objects based on large scale real-time aerial images.

BACKGROUND

Currently, various sensor platforms can be used for persistently monitoring very large areas. For example, Wide Area Motion Imagery (WAMI) systems mounting on aerial platform flying at around 7,000 feet can be used as an aid in disaster relief, as well as traffic and accident management. Such systems typically produce an overwhelmingly large amount of information. Monitoring such a large amount of data with a human operator is not feasible, which calls for an automated method of processing the collected imagery.

Traditional visual detection algorithms mainly focus on detecting a limited number of objects in small scenes and therefore cannot be directly generalized to WAMI scenarios.

The large scale images taken by WAMI systems are more than 8,000,000 pixels in resolution. Objects in WAMI data are much smaller than that collected from imagery around 2000 feet, with vehicle sizes ranging from 4 pixels to 70 pixels in grayscale image groups. The lack of computationally efficient imagery analysis tools has become a bottleneck for utilizing WAMI data for urban surveillance.

Accordingly, it is desirable to provide methods and systems for detecting multiple moving objects based on large scale aerial images via high performance computation technology.

BRIEF SUMMARY

In accordance with some embodiments of the disclosed subject matter, a method and a system for detecting multiple objects from real-time images are provided.

An aspect of the disclosed subject matter provides a method for detecting multiple objects from real-time images, comprising: performing, using a central processing unit (CPU) host, an image segmentation process to divide real-time input images into a plurality of image partitions; allocating a multitude of image memory according to the plurality of image partitions for parallel computation in a plurality of graphics processing units (GPUs); performing, by registration kernels of the plurality of GPUs, a fast block-wise registration process to register the plurality of image partitions; performing, by mask setting kernels of the plurality of GPUs, a mark setting process for the registered image partitions to stitch the registered images into output images; performing, by background generation kernels of the plurality of GPUs, a background generation process based on the output images to generate background images through median filter; performing, by foreground generation kernels of the plurality of GPUs, a foreground generation process based on the output images to generate foreground images based on a Hyper-Q computation infrastructure; performing, by classification kernels of the plurality of GPUs, a support vector machine classification process to classify a plurality of objects of the real-time input images; and generating, by the CPU host, visualization classification images based on the background images, foreground images and the plurality of objects.

In some embodiments, the real-time input images are generated from a Wide Area Motion Imagery system on an aerial platform; a frame rate of the real-time input images is at least two frames per second; and a scale of each real-time input image has a magnitude of million orders in resolution.

In some embodiments, the fast block-wise registration process is a Compute Unified Device Architecture (CUDA) based parallel computing infrastructure, and comprises: performing a block-wise speeded up robust features extraction process for each image partition; performing a point matching process for each image partition; using a random sample consensus algorithm to remove outlier points from the plurality of image partitions; and performing a transformation estimation process of the image partitions to generate block-wise homography matrices.

In some embodiments, each registration kernel is configured to have one node integrated with eight groups of four image partitions at a time instant.

In some embodiments, stitching portions of the registered image partitions is based on the block-wise homography matrices generated from the transformation estimation process, wherein a number of threads per block is consistent with available shared memory of the plurality of GPUs.

In some embodiments, the point matching process is based on Brute-force (BF) or Fast Library for Approximate Nearest Neighbors (FLANN).

In some embodiments, the background generation process comprises a background setting step, an image averaging step, and a background extraction step, and is a parallelized process implemented based on the plurality of GPUs using data CUDA structure dim3.

In some embodiments, the foreground generation process comprises a pixel value comparison step, a value assigning step, and a foreground extraction step, implements the Hyper-Q computation framework to enable multiple CPU cores to launch work on a single GPU simultaneously for increasing GPUs utilization and slashing CPU idle time, and introduces Grid management Unit to create multiple hardware work queues to reduce the synchronization time.

In some embodiments, the support vector machine classification process comprises: implementing histogram of oriented gradients (HoG) to compute color gradients and obtain gradient magnitudes and orientations via convolution; and calculating probabilities or confidence levels of the multiple objects based on the gradient magnitudes and orientations.

In some embodiments, the method further comprises asynchronously transmitting the classified plurality of objects from the multiple GPUs to the CPU host to reduce or eliminate a synchronization time.

In some embodiments, the method further comprises generating a graphical user interface through open source computer vision library associated with the CPU host for monitoring the multiple objects on the visualization and classification images in real-time, wherein the multiple objects include at least vehicles and people.

Another aspect of the disclosed subject matter provides a system for detecting multiple objects from real-time aerial images, comprising: a CPU host configured for: performing an image segmentation process to divide real-time input images into a plurality of image partitions, and allocating a multitude of image memory according to the plurality of image partitions for parallel computation; and a plurality of GPUs comprising: registration kernels for performing a fast block-wise registration process to register the plurality of image partitions, mask setting kernels for performing a mark setting process for the registered image partitions to stitch the registered images, background generation kernels for performing a background generation process based on the output images to generate background images through median filter, foreground generation kernels for performing a foreground generation process based on the registered images to generate foreground images based on a Hyper-Q computation framework, and classification kernels for performing a support vector machine classification process to classify a plurality of objects of the real-time input images; wherein the CPU host is further configured for generating visualization classification images based on the background images, foreground images and the plurality of objects.

In some embodiments, the real-time input images are generated from a Wide Area Motion Imagery system on an aerial platform; a frame rate of the real-time input images is at least two frames per second; a scale of each real-time input image has a magnitude of million orders of pixels in resolution; and the multiple objects include at least vehicles and people.

In some embodiments, the registration kernels are configured for performing the fast block-wise registration process based a Compute Unified Device Architecture (CUDA) based parallel computing infrastructure, by: performing a block-wise speeded up robust features extraction process for each image partition; performing a point matching process for each image partition; using a random sample consensus (RANSAC) algorithm to remove outlier points from the plurality of image partitions; and performing a transformation estimation process of the image partitions to generate block-wise homography matrices; wherein each registration kernel is configured to have one cluster integrated with eight groups of four image partitions at a time instant.

In some embodiments, the mark setting kernels are configured for: stitching portions of the registered image partitions based on the block-wise homography matrices generated from the transformation estimation process; wherein a number of threads per block is consistent with available shared memory of the plurality of GPUs.

In some embodiments, the background generation kernels are configured for: performing a background setting step for setting each image partition to a mask with zero pixel values, an image averaging step, and a background extraction step; and implementing a parallelized process based on the plurality of GPUs based in CUDA data structure dim3.

In some embodiments, the foreground generation kernels are configured for: performing a pixel value comparison step, a value assigning step, and a foreground extraction step; implementing the Hyper-Q computation framework to enable multiple CPU cores to launch work on a single GPU simultaneously for increasing GPUs utilization and slashing CPU idle time; and introducing Grid Management Unit to create multiple hardware work queues to reduce a synchronization time.

In some embodiments, the classification kernels are configured for: implementing histogram of oriented gradients to compute color gradients and obtain gradient magnitudes and orientations via convolution; and calculating probabilities or confidence levels of the multiple objects based on the gradient magnitudes and orientations.

In some embodiments, the classified plurality of objects are asynchronously transmitted from the multiple GPUs to the CPU host to reduce or eliminate a synchronization time.

In some embodiments, the CPU host is further configured for: generating a graphical user interface through an open source computer vision library for monitoring the multiple objects on the visualization classification images in real-time.

Other aspects of the disclosed subject matter can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a method for detecting multiple moving objects based on Wide Area Motion Imagery (WAMI) datasets via parallel computation in graphics processing units (GPUs). In accordance with some other embodiments, the disclosed subject matter provides a High Performance Computing based system to implement the disclosed method.

Note that, Wide Area Motion Imagery (WAMI), in its various forms, is also referred to as Wide Area Airborne Surveillance (WAAS), Wide Area Persistent Surveillance (WAPS), Persistent Wide Area Surveillance (PWAS), Wide Area Surveillance (WAS), and Large Volume Streaming Data (LVSD), etc. Simply put, WAMI captures a video of an area the size of a town or city, day and night. It is a system that uses one or more cameras mounted on the some form of a gimbal on an aerial platform, such as an aircraft or blimp, to capture a very large area on the ground, from about once every second up to several times per second. Persistent surveillance captures the same general area on the ground over a length of time.

In some embodiments, median background modeling is implemented via GPUs to tackle the high computation complexity of the multiple moving objects detection. For avoiding the requirement of the large memory and throughput of large scale images, a novel fast block-wise image registration and multiple moving target detection infrastructure based on the GPUs are provided.

In some embodiments, an asynchronous multiple object detection can be achieved by the disclosed high performance computing based system. For example, detection or classification of multiple objects of interest from image groups, frame 0 to frame 7 for instance, may be monitored based on asynchronous exchange information between GPUs and CPUs and adaptive parallel computing implementation on the CPU-GPU system.

For example, detection or classification of multiple objects of interest may be performed within the framework of a Compute Unified Device Architecture (CUDA) based parallel computing infrastructure for the application of monitoring. The disclosed method and system may innovate an operator-friendly graphical user interface (GUI) for observing and monitoring the detection results (e.g., in a form of boxes to highlight) in real-time. The disclosed parallel computing based approach has a general purpose in the sense that the same idea can be applied and extended to other types of methods, such as Pedestrian Detection based on large scale urban images.

Comparing to applying the detection process in central processing unit (CPU) alone, the application of parallel computing structure based on CUDA Basic Linear Algebra Subroutines (cuBLAS) can reach a real-time outcome of detection and visualization. Moreover, the obtained detection or the classification results for the multiple objects may indicate that the parallel-based approach provides dramatically improved, speed-up performance in real-time and under realistic conditions.

Figure 1:
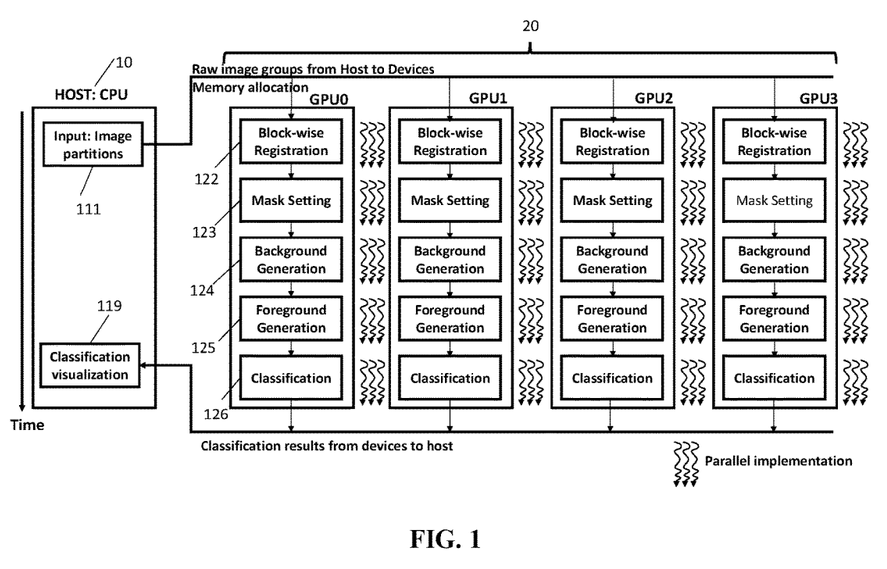
FIG. 1 illustrates an exemplary method for detecting multitude of objects in accordance with various embodiments of disclosed subject matter.

Referring to FIG. 1, an exemplary method for detecting multitude of objects is shown in accordance with various embodiments of disclosed subject matter.

As illustrated, the method can be implemented by a system including a CPU host 10 and multiple GPUs 20.

In some embodiments, the CPU host 10 includes at least one central processing unit (CPU). In the example as shown in FIG. 1, four graphics processing units GPU0, GPU1, GPU2 and GPU3 can be used to apply parallel image processing. In some embodiments, multiple GPUs can be used for rapidly manipulating memory to accelerate the image processing. Any suitable number of GPUs can be used in the system according to various embodiments of the present disclosure.

At step 111, the CPU host can perform image partitions to divide the input images into multiple raw image groups, and can distribute the multiple raw image groups to the multiple GPUs. For processing the large resolution images, it is inevitable to divide the images into partitions since the GPUs include multiple CUDA computation cores with limited memory. It is more efficient for the GPUs to process the partitions of sub-images rather than an entire intact raw image.

In some embodiments, the input images are large scale images generated by WAMI systems. For example, each input image has more than 8,000,000 pixels in resolution. Objects in an input image may only comprise a few pixels. For example, the size of a vehicle can range between 4 pixels and 70 pixels in grayscale image groups.

In some embodiments, the input images are real-time collected images. For example, the frame rate of the input images can be equal or larger than two frames per second.

In some embodiments, the method further includes adaptive memory allocation corresponding to the size of block-wise partitioned image groups associated with the GPUs.

Figure 2:
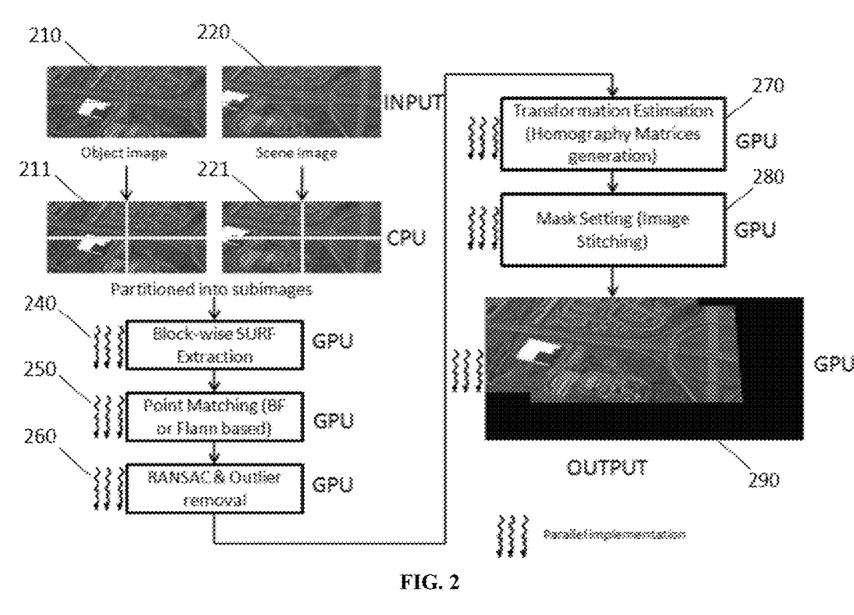
FIG. 2 illustrates an exemplary process of image partition, block-wise registration, and mask-setting in accordance with various embodiments of disclosed subject matter.

As a specific example, as illustrated in FIG. 2, two successive raw input images include a front frame and a rear frame. The front frame can be an object image 210, and the rear frame can be a scene image 220. A CPU can perform an image segmentation processes to respectively divide the object image 210 into four object sub-images 211, and divide the scene image 220 into four scene sub-images 221.

Turning back to FIG. 1, at step 122, block-wise image registration are performed by CUDA based registration kernels of GPUs. In some embodiments, the block-wise image registration kernel is configured to have one cluster integrated with eight groups of four image partitions at a time instant.

Block-wise image registration is a highly parallelized image processing. The multiple GPUs are very efficient to process the partitioned image blocks. The speed-up performance is very promising based on real-data experiment and test. The scene images are then warped to the coordinate of the object images based on the block-wise transformation estimation.

Referring to FIG. 2, an exemplary detailed process of image partition, block-wise registration, and mask-setting is shown in accordance with various embodiments of disclosed subject matter.

After the object image 210 being divided into four image sub-images 211, and the scene image being divided into four scene image partitions 221, the four image sub-images 211 and four scene image partitions 221 can be separately input into multiple GPUs.

In some embodiments, the block-wise image registration process performed in parallel by the multiple GPUs can include four steps described in the following.

At 240, block-wise speeded up robust features (SURF) extraction can be performed. In this step 240, point correspondences between two images of the same scene or object can be found. For example, some interest point can be selected at distinctive locations in the image, such as corners, blobs, and T-junctions. Then, the neighborhood of every interest point can be represented by a feature vector. Next, the feature vectors can be matched between the two images. In some embodiments, the matching is based on a distance between the vectors, e.g., the Mahalanobis or Euclidean distance.

In some embodiments, the block-wise SURF extraction can be achieved by relying on integral images for image convolutions, and by building on the strengths of the leading existing detectors and descriptors. For example, a Hessian matrix-based measure can be used for the detector, and a distribution-based descriptor for feature analysis.

At 250, point matching can be performed. In some embodiments, any suitable algorithm for performing fast approximate nearest neighbor searches in high dimensional spaces can be used to realize the point matching. For example, the point matching can be Brute-force (BF) based, or FLANN based.

At 260, random sample consensus (RANSAC) and outlier removal can be performed. The RANSAC algorithm is an iterative method to estimate parameters of a mathematical model from a set of observed data which contains outlier by random sampling of observed data. Given a dataset whose data elements contain both inliers and outliers, RANSAC uses the voting scheme to find the optimal fitting result. Therefore, RANSAC can be performed as a learning technique to find outlier points from the results of the point matching. And then the outlier points can be removed.

At 270, transformation estimation can be performed. In some embodiments, the transformation estimation can be applied among the object image blocks and corresponding scene image blocks to generate homography matrices. The estimated block-wise homography matrices can be used to warp the scene image blocks to the coordinate of the object image blocks.

Figure 3:
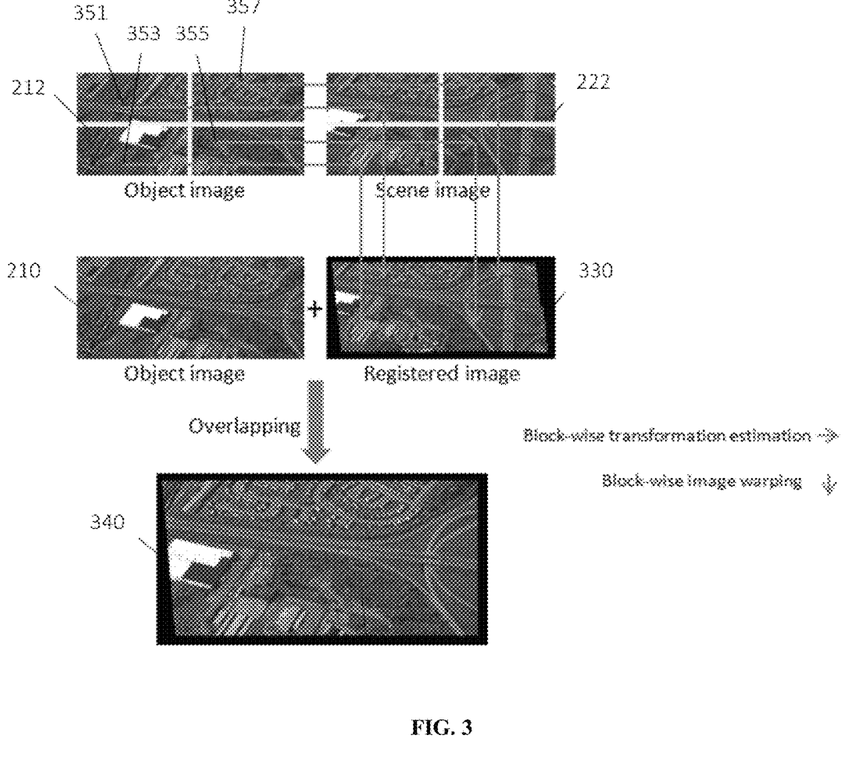
FIG. 3 illustrates an exemplary procedure of block-wise transformation estimation and block-wise image warping in accordance with various embodiments of disclosed subject matter.

Referring to FIG. 3, an exemplary procedure of block-wise transformation estimation and block-wise image warping is shown in accordance with some embodiments.

As illustrated, the object image 210 can be divided into four image sub-images 211. For each image partition, at least one image partition feature can be identified. For example, the four image partition features 351, 353, 355, and 357 can be identified and recorded.

A scene image, which can be a frame overlapping with the frame of the object image, can also be divided into four image partitions 221. A block-wise transformation estimation process can match the identified image partition features on the four image partitions 221. Based on the new positions of the identified image partition features located in the four image partitions 221, each of the image partition of the scene image 221 can be registered. Therefore, a registered image 330 can be combined based on the registered image partition of the scene image 221.

Accordingly, turning back to FIG. 2, the image registration process can include feature extraction, feature matching, random sample consensus (RANSAC), and transformation estimation.

It should be noted that, local features such as scale-invariant feature transform (SIFT) and speeded up robust features (SURF) bring new potential for feature based WAMI image registration due to the scale invariance detector and the distinctiveness of the descriptor. However, the outstanding property of WAMI images is the overwhelming increase in the image size, which results in the prohibitive memory requirement and computational complexity. Thus coarse image registration usually takes unfavorable processing time based on CPU infrastructure. Moreover, local features such as SIFT and SURF are not supportive based on the smoothed images down-sampled either by Gaussian Pyramid or interlaced sampling. In the step of fast block-wise registration, the feature detection and feature description (extraction) are frequently used. The feature detection and description are speeded up based on the block-wise computation architecture.

Turning back to FIG. 1, mark settings for the registered image groups can be applied based on the block-wise image registration by mask setting kernels of GPUs at step 123.

Referring to step 280 in FIG. 2, portions of the registered images can be collected on a mask via image stitching by kernels of the GPUs. In some embodiments, when launching the mask setting or image stitching kernel, the number of groups of four image partitions is consistent with an available shared memory of the GPUs.

As can be seen in FIG. 3, the transformation estimation is applied among the object image blocks and corresponding scene image blocks. The estimated block-wise homography matrices generated by the transformation estimation can be used to warp the scene image blocks to the coordinate of the object image blocks. Accordingly, a fused image 340 can be obtained by overlapping the object image 210 and the registered image 330. Returning back to FIG. 2, the fused image 340 can be used as an output 290.

As illustrated in both FIGS. 1 and 2, the block-wise registration and mask-setting processes are highly parallel. Considering the fact that GPUs are designed to operate concurrently, the block-wise feature detection and description, the point matching, the RANSAC, the block-wise transformation estimation, and the block-wise image warping are all processed in GPUs. Only the image partition is performed in CPU.

Turning back to FIG. 1, at step 124, background generation are performed by background generation kernels of GPUs. The background generation can be performed through a median filter.

Figure 5:
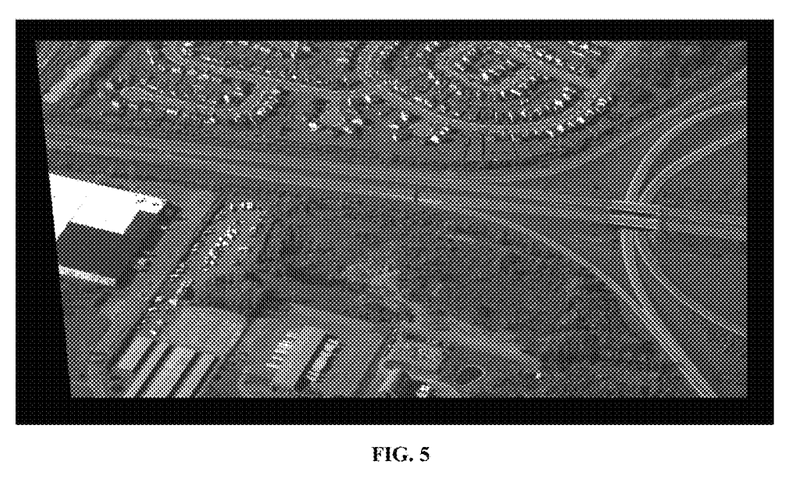
FIG. 5 illustrates visualization of an exemplary background image in accordance with some other embodiments of the disclosed subject matter.

In some embodiments, each background generation kernel is configured to have one node integrated with a group of eight registered images at a time instant. For example, background generation can be performed for each group of eight WAMI images based on the stitched image by GPUs to generate one background image. As an illustrative example, referring to FIG. 5, a visualization of an exemplary background image is shown accordance with some embodiments of the disclosed subject matter.

At step 125, foreground generation kernels are performed by foreground generation kernels of GPUs. The foreground generation can be performed based on image differences.

Figure 6:
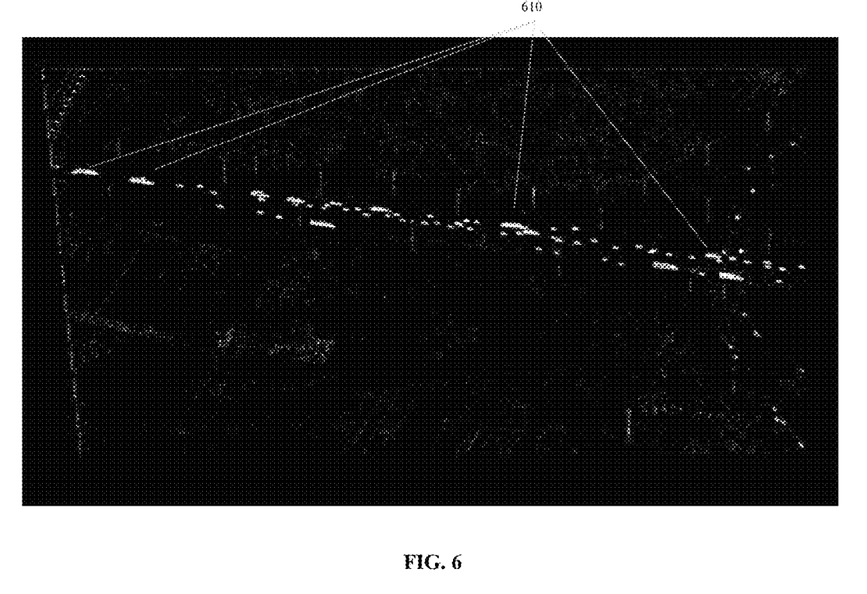
FIG. 6 illustrates visualization of an exemplary foreground image in accordance with various embodiments of present disclosure.

In some embodiments, each foreground generation kernel is configured to have one cluster integrated with a group of eight registered images at a time instant. For example, foreground generation can be performed for each group of eight WAMI images based on the background image by GPUs to generate eight corresponding foreground images. As an illustrative example, referring to FIG. 6, a visualization of an exemplary foreground image is shown accordance with some embodiments of the disclosed subject matter. The highlighted objects 610 on the black background are the extracted foreground images such as vehicle images and/or people images.

Figure 4:
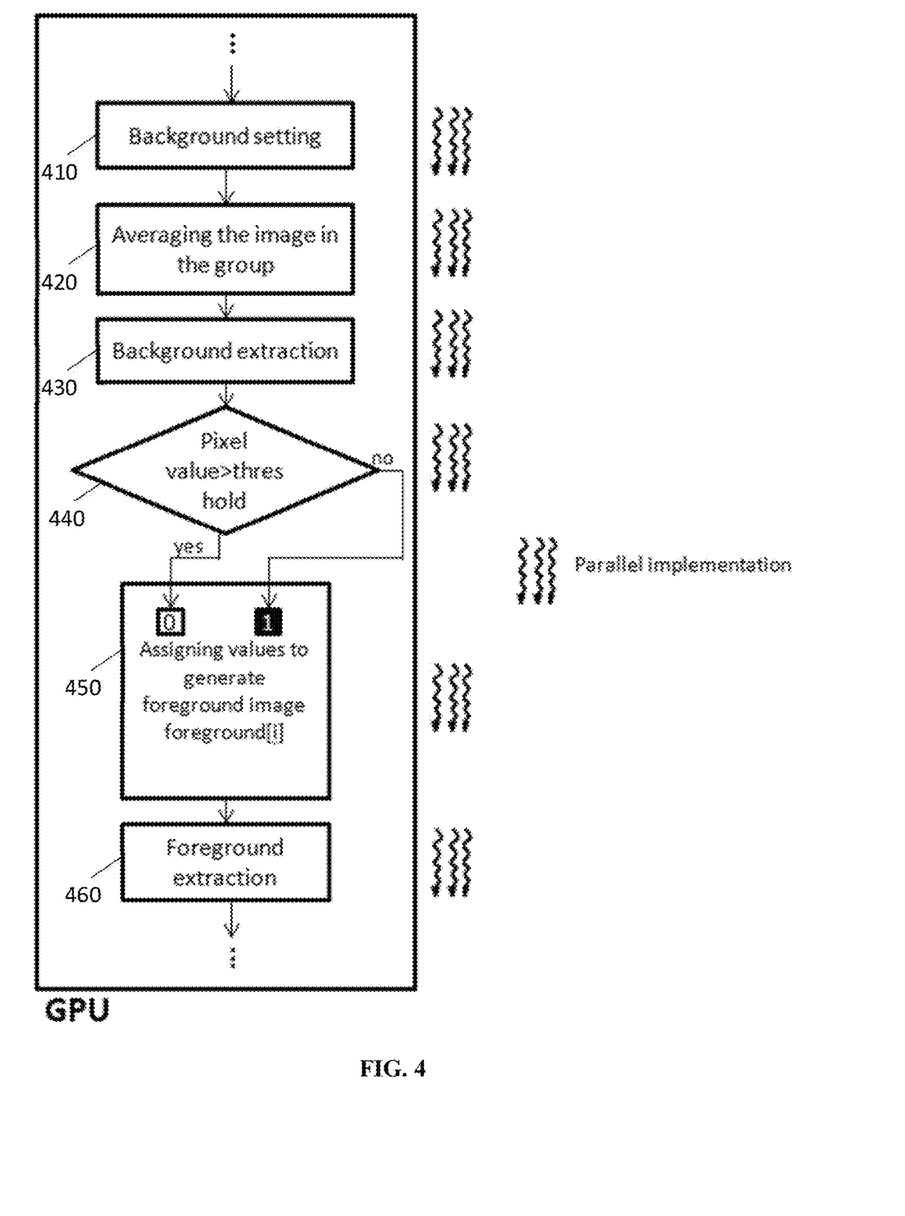
FIG. 4 illustrates a flowchart of background generation and foreground generation processes in accordance with some embodiments of the disclosed subject matter.

Referring to FIG. 4, a flowchart of background generation and foreground generation processes is shown in accordance with some embodiments of the disclosed subject matter.

As illustrated, the background generation process can include background setting at 410, averaging the image in the group at 420, and background extraction at 430. The background generation is a parallelized process implemented based on GPUs. Background setting is a step of setting the whole image to a mask with zero pixel values.

Noted that, CPU based background generation in the WAMI system is full of two-dimensional traversal of the image sequences. This operational structure costs a lot of computation especially when the input sequence is large size images. For instance, the background extraction performed in the system contains three nested FOR loops which are the size of height, the size of width and the size of the image groups.

Therefore, GPU computation can be applied to accelerate the background generation. The CUDA data structure dim3 is quite applicable in GPUs to solve such problems such as memory allocation and parallel computation since the input are three-channel images in a WAMI system. This computational structure, used to specify the grid and block size, has three members [x, y and z] when compiling with C++. Thus, it is applied to store the image groups in device memory. Computation of a tile based in the data structure dim3 can be arranged, such that interactions in each row can be evaluated in a sequential order, while separate rows are evaluated in parallel in the GPUs.

As illustrated in FIG. 4, the foreground generation process can include pixel value comparison at 440, assigning values to generate foreground image at 450, and foreground extraction at 460.

In some embodiments, the pixel values of output images 290 can be compared with a predetermined threshold value. For example, if a grey value of a pixel is larger than the predetermined threshold value ("yes" at step 440), the pixel can be determined as a portion of the foreground image, and the pixel can be assigned as a value of "0" at step 450. On the other hand, if a gray value of a pixel is smaller than the predetermined threshold value ("no" at step 440), the pixel can be determined as a portion of the background image, and the pixel can be assigned as a value of "1" at step 450.

The foreground generation is also a parallelized process implemented based on GPUs. CPU based foreground generation has the same problem as the background generation. The only difference is that the outer loop is the size of image group, and the inner loops are size of height and the size of width. Rather than as background generation, the output of foreground generation is a group of eight binary (black and white) foreground images. Since the input are eight registered WAMI images, for the construction convenience of the GPU implementation, the two inner loops are performed in GPUs. This computational architecture based on the IF-ELSE statement is quite efficient in GPU platform.

In some embodiments. an implementation of Hyper-Q can further improved the speed-up performance of foreground generation. Hyper-Q is a flexible solution that allows connections for both Compute Unified Device Architecture (CUDA) streams and Message Passing Interface (MPI) processes. It enables multiple CPU cores to launch work on a single GPU simultaneously, thereby drastically increasing GPU utilization and slashing CPU idle time. In other words, Hyper-Q ensures the GPUs stay as occupied as possible.

Grid Management Unit (GMU) can be introduced to create multiple hardware work queues to reduce the synchronization time. With the GMU, streams such as grey value comparison (kernel compare( )) and foreground generation (kernel foreground( )) in the steps of foreground generation can be kept as individual pipelines of work.

A Hyper-Q feature on GPUs in the context of multi-thread/multi-process application with uncoordinated offloads to the GPUs during the CPU host computation is developed. In some embodiments, multiple workloads during the CPU host computation are sent back to GPUs. These components provide dynamic parallelism and CUDA output asynchronous transmission.

On a device with Hyper-Q disabled, the single work pipeline in hardware means that only concurrency can be seen between pairs of grey value comparison kernel from stream n and foreground kernel from stream n+1. While on a device with Hyper-Q, the synchronization time are eliminated and all the kernels can execute concurrently in the profile of the running time.

Figure 7:
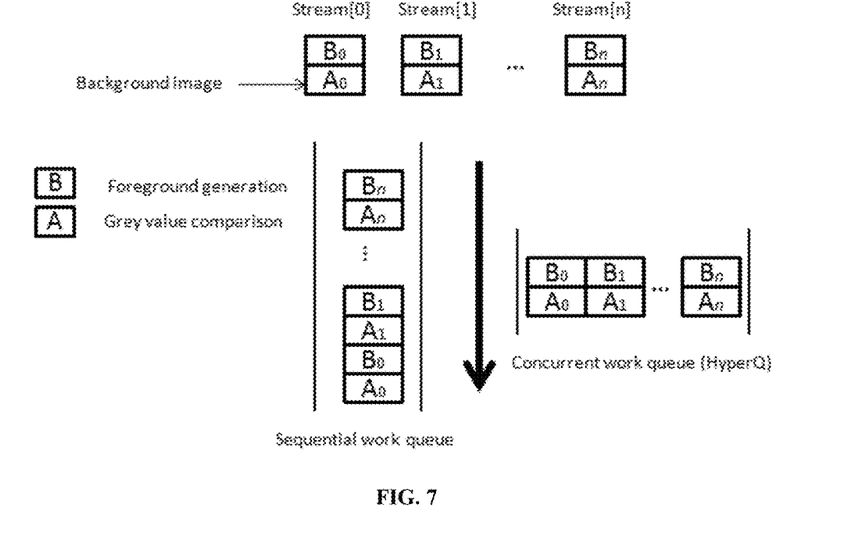
FIG. 7 illustrates an exemplary computation infrastructure of foreground generation applied based on Hyper-Q in accordance with various embodiments of present disclosure.

Referring to FIG. 7, an exemplary computation infrastructure of foreground generation especially applied based on Hyper-Q is shown in accordance with some embodiments of the disclosed subject matter.

As illustrated, the running time of the devices implemented based on sequential work queue and concurrent work queue (Hyper-Q) is along the black arrow. A and B represent two parallel tasks: grey value comparison and foreground generation. In a sequential work queue, the processing of the tasks is in a serial manner and time-consuming. While in the concurrent work queue, the execution of the stream work is concurrent. Computation time spent in concurrent work queue is much less than sequential work queue.

Below sample code uses a depth-first launch as described above to demonstrate how Hyper-Q allows the independent kernels to be executed concurrently, regardless of the launch order. After initializing and checking the device properties, the code creates a number of streams nstreams and launches a pair of kernels into each stream as follows:

```
for (int i=0, i<nstreams; i++){
compare <<< gdim, bdim, smem, streams[i]>>> (images in device);
foreground <<<gdim, bdim, smem, streams[i]>>> (images in device);
}
```

Each kernel is launched as a single thread, which simply executes a loop for a defined amount of time and saves the total number of clock cycle to memory, where gdim is the dimension of the grids, bdim is the dimension of the blocks and smem is the additional shared memory to reserve for each block. In our case, the configuration dim3 block(32,8) and dim3 grid((width+block.x−1)/block.x, (height+block.y−1)/block.y) is applied here.

Since many GPU applications are limited by the memory bandwidth of the compute system rather than by its compute performance, for Hyper-Q it is important to know how multiple simultaneous executions on the GPUs affect each other, especially with respect to sharing the GPU memory bandwidth. In some embodiments, eight streaming processes of foreground generation can be executed simultaneously.

Returning to FIG. 1, at step 126, classification can be performed by classification kernels of GPUs. In some embodiments, the classification process can be performed based on support vector machine (SVM).

In SVM classification, a histogram of oriented gradients (HOG) feature used in the detection can be implemented. It should be emphasized that the process to obtain HOG feature is computationally intensive. Gradients can be computed and gradient magnitude and orientations are obtained via convolution. In addition, trilinear interpolation and Gaussian weighting can be used to obtain the block histogram.

In some embodiments, one thread block in GPUs is responsible for the one HOG block. Each thread can work on one column of gradient orientations and magnitudes. Then each of the block normalization and SVM evaluation steps can be done by separate kernels. In some embodiments, eight threads per cell can be employed. Additionally, the kernel matrix computation used in the SVM classifier can be implemented on GPUs to speed up the performance of the HOG detector.

In some embodiments, probabilities or the confidence levels of each classified object of interest can be calculated based on SVM evaluation. The classified objects of interest include vehicles and people, and can be updated in an online or on-the-fly manner.

At step 119, multiple classification results can be transferred from the multiple GPUs 20 to the CPU host 10, and the CPU host 10 can perform a classification visualization process based on the multiple classification results to generated a classification image. The classification results generated by the multiple GPUs can be asynchronously transmitted from the GPUs to the CPU host to reduce or eliminate a synchronization time.

Figure 8:
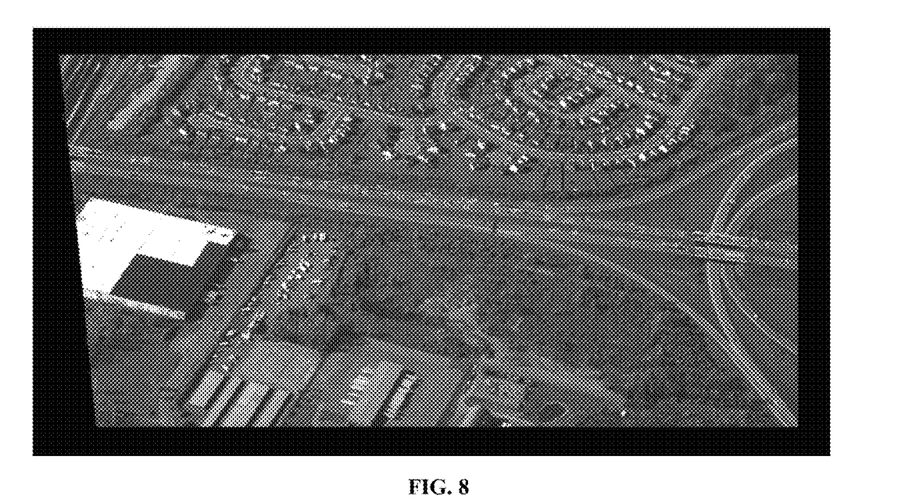
FIG. 8 illustrates visualization of an exemplary classification image in accordance with various embodiments of present disclosure.

For example, referring to FIG. 8, a visualization of an exemplary classification image is shown accordance with some embodiments of the disclosed subject matter. As illustrated, the classification image can be obtained based on the background image and foreground image shown in FIGS. 5 and 6 respectively. The final classification results of possible vehicle detection can be identified on the classification image.

In some embodiments, the initial configuration parameters of the registration, mask setting, background generation, foreground generation and classification are provided by the CPU host, and transferred from the CPU host to the GPUs, for the GPUs to generate the classification results according to the initial configuration parameters.

In some embodiments, a graphical user interface (GUI) can be generated for observing and monitoring the multiple objects detection in real-time during the image processing from the video stream. For example, a real-time GUI can be generated for illustrating background images, foreground images, and classification images, such as the background image, foreground image, and classification image shown in FIGS. 5, 6 and 8. As another example, final detection image corresponding to the detected objects of interest can be displayed through open source computer vision (OpenCV) library associated with the CPU host.

Figure 9:
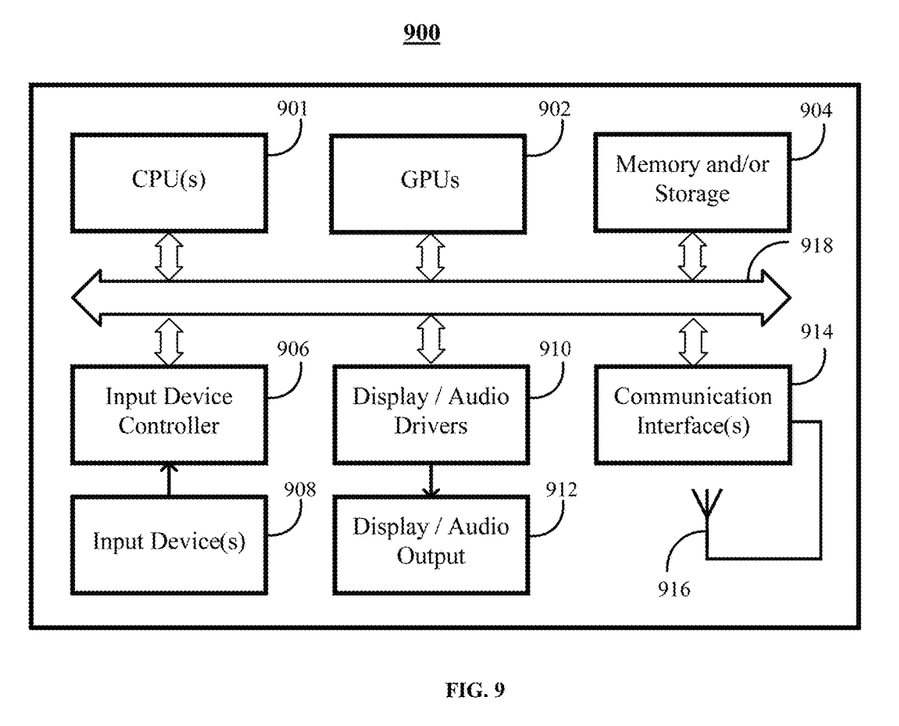
FIG. 9 illustrates a schematic diagram of hardware of an exemplary system for detecting multiple moving objects based on large scale images in accordance with some embodiments of the disclosed subject matter.

Referring to FIG. 9, a schematic diagram of hardware of an exemplary system for detecting multiple moving objects based on large scale images is shown in accordance with some other embodiments of the disclosed subject matter.

As illustrated in the exemplary system hardware 900, such hardware can include at least one central processing unit (CPU) 901, multiple graphics processing units (GPUs) 902, memory and/or storage 904, an input device controller 906, an input device 908, display/audio drivers 910, display and audio output circuitry 912, communication interface(s) 914, an antenna 916, and a bus 918.

At least one central processing unit (CPU) 901 can include any suitable hardware processor, such as a microprocessor, a micro-controller, digital signal processor, array processor, vector processor, dedicated logic, and/or any other suitable circuitry for controlling the functioning of a general purpose computer or special purpose computer in some embodiments.

The multiple graphics processing units (GPUs) 902 include at least four graphics processing units. The graphics processing unit can have any suitable form, such as dedicated graphics card, integrated graphics processor, hybrid form, stream processing form, general purpose GPU, external GPU, and/or any other suitable circuitry for rapidly manipulating memory to accelerate the creation of images in a frame buffer intended for output to a display in some embodiments.

In some embodiments, the at least one CPU 901 and the multiple GPUs 902 can implement or execute various embodiments of the disclosed subject matter including one or more method, steps and logic diagrams. For example, as described above in connection with FIG. 1, the at least one CPU 901 can perform at least the steps of image partitions and classification visualization, etc. And the multiple GPUs 902 can perform at least the steps of block-wise registration, mask setting, background generation, foreground generation, classification, etc. In some embodiments, the multiple GPUs 902 can implement the functions in parallel, as illustrated in FIG. 1.

It should be noted that, the exemplary system hardware 900 is a GPU-CPU based system integrated by at least one CPU and multiple GPUs. In some embodiments, asynchronous transmission based on a new CUDA feature, Hyper-Q, can be implemented to reduce the communication between the CPU host and the GPUs.

The steps of the disclosed method in various embodiments can be directly executed by a combination of the at least one CPU 901, and/or the multiple GPUs 902, and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the memory and/or storage 904. The at least one central processing unit (CPU) 901 and the multiple graphics processing units (GPUs) 902 can implement the steps of the disclosed method by combining the hardware and the information read from the memory and/or storage 904.

Memory and/or storage 904 can be any suitable memory and/or storage for storing programs, data, media content, comments, information of users and/or any other suitable content in some embodiments. For example, memory and/or storage 904 can include random access memory, read only memory, flash memory, hard disk storage, optical media, and/or any other suitable storage device.

Input device controller 906 can be any suitable circuitry for controlling and receiving input from one or more input devices 908 in some embodiments. For example, input device controller 906 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 910 can be any suitable circuitry for controlling and driving output to one or more display and audio output circuitries 912 in some embodiments. For example, display/audio drivers 910 can be circuitry for driving an Liquid Crystal Display (LCD), a speaker, a Light Emitting Diode (LED), and/or any other display/audio device.

Communication interface(s) 914 can be any suitable circuitry for interfacing with one or more communication networks. For example, interface(s) 914 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a Wide Area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Antenna 916 can be any suitable one or more antennas for wirelessly communicating with a communication network in some embodiments. In some embodiments, antenna 916 can be omitted when not needed.

Bus 918 can be any suitable mechanism for communicating between two or more of components 902, 904, 906, 910, and 914 in some embodiments. Bus 918 may be an enterprise service, such as an Industry Standard Architecture (ISA) bus, a Peripheral Component Interconnect (PCI) bus, an Extended ISA (EISA) bus, or any other suitable bus. The bus 918 can be divided into an address bus, a data bus, a control bus, etc. The bus 918 is represented as a two-way arrow in FIG. 9, but it does not mean that it is only one type bus or only one bus.

Any other suitable components can be included in hardware 900 in accordance with some embodiments.

In some embodiments, the hardware of the exemplary system for detecting multiple moving objects based on large scale images can be mounted onboard of an aerial platform such as an airplane, blimp, or unmanned aerial vehicle (UAV). In some other embodiments, the hardware of the exemplary system for detecting multiple moving objects based on large scale images can be placed on the ground from stationary or mobile platforms.

In addition, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions. It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in. It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods and systems for detecting multiple moving objects based on large scale aerial images via high performance computing are provided. In the disclosed method and system, the moving objects visualization uses highly parallel algorithms to achieve a real-time performance.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for detecting multiple objects from real-time images, comprising:
    performing, using a central processing unit (CPU) host, an image segmentation process to divide real-time input images into a plurality of image partitions;
    allocating a multitude of image memory according to the plurality of image partitions for parallel computation in a plurality of graphics processing units (GPUs);
    performing, by registration kernels of the plurality of GPUs, a fast block-wise registration process to register the plurality of image partitions;
    performing, by mask setting kernels of the plurality of GPUs, a mark setting process for the registered image partitions to stitch the registered images into output images;
    performing, by background generation kernels of the plurality of GPUs, a background generation process based on the output images to generate background images through median filter;
    performing, by foreground generation kernels of the plurality of GPUs, a foreground generation process based on the output images to generate foreground images based on a Hyper-Q computation framework;
    performing, by classification kernels of the plurality of GPUs, a support vector machine classification process to classify a plurality of objects of the real-time input images; and
    generating, by the CPU host, visualization classification images based on the background images, foreground images and the plurality of objects.

2. The method of claim 1, wherein:
    the real-time input images are generated from a Wide Area Motion Imagery system on an aerial platform;
    a frame rate of the real-time input images is at least two frames per second; and a scale of each real-time input image has a magnitude of million orders of pixels in resolution.

3. The method of claim 1, wherein:
the fast block-wise registration process is a Compute Unified Device Architecture (CUDA) based parallel computing infrastructure, and comprises:
performing a block-wise speeded up robust features extraction process for each image partition;
performing a point matching process for each image partition;
using a random sample consensus algorithm to remove outlier points from the plurality of image partitions; and
performing a transformation estimation process of the image partitions to generate block-wise homography matrices.

4. The method of claim 1, wherein each registration kernel is configured to have one computation node integrated with eight groups of four image partitions at a time instant.

5. The method of claim 3, wherein the mark setting process comprises:
stitching portions of the registered image partitions based on the block-wise homography matrices generated from the transformation estimation process;
wherein a number of threads per block is consistent with available shared memory of the plurality of GPUs.

6. The method of claim 3, wherein the point matching process is based on Brute-force (BF) or Fast Library for Approximate Nearest Neighbors (FLANN).

7. The method of claim 1, wherein the background generation process:
comprises a background setting step for setting each image partition to a mask with zero pixel values, an image averaging step, and a background extraction step; and
is a parallelized process implemented based on the plurality of GPUs using data CUDA structure dim3.

8. The method of claim 1, wherein the foreground generation process:
comprises a pixel value comparison step, a value assigning step, and a foreground extraction step;
implements the Hyper-Q computation infrastructure to enable multiple CPU cores to launch work on a single GPU simultaneously for increasing GPUs utilization and slashing CPU idle time; and
introduces Grid Management Unit to create multiple hardware work queues to reduce a synchronization time.

9. The method of claim 1, wherein the support vector machine classification process comprises:
implementing histogram of oriented gradients (HOG) to compute color gradients and obtain gradient magnitudes and orientations via convolution; and
calculating probabilities or confidence levels of the multiple objects based on the gradient magnitudes and orientations.

10. The method of claim 1, further comprising:
asynchronously transmitting the classified plurality of objects from the multiple GPUs to the CPU host to reduce or eliminate a synchronization time.

11. The method of claim 1, further comprising:
generating a graphical user interface through an open source computer vision library associated with the CPU host for monitoring the multiple objects on the visualization classification images in real-time;
wherein the multiple objects include at least vehicles and people.

12. A system for detecting multiple objects from real-time images, comprising:
a CPU host configured for:
performing an image segmentation process to divide real-time input images into a plurality of image partitions, and
allocating a multitude of image memory according to the plurality of image partitions for parallel computation; and
a plurality of graphics processing units (GPUs) comprising:
registration kernels for performing a fast block-wise registration process to register the plurality of image partitions,
mask setting kernels for performing a mark setting process for the registered image partitions to stitch the registered images into output images,
background generation kernels for performing a background generation process based on the output images to generate background images through median filter,
foreground generation kernels for performing a foreground generation process based on the output images to generate foreground images based on a Hyper-Q computation infrastructure, and
classification kernels for performing a support vector machine classification process to classify a plurality of objects of the real-time input images;
wherein the CPU host is further configured for generating visualization classification images based on the background images, foreground images and the plurality of objects.

13. The system of claim 12, wherein:
the real-time input images are generated from a Wide Area Motion Imagery system on an aerial platform;
a frame rate of the real-time input images is at least two frames per second;
a scale of each real-time input image has a magnitude of million orders of pixels in resolution; and
the multiple objects include at least vehicles and people.

14. The system of claim 12, wherein:
the registration kernels are configured for performing the fast block-wise registration process based a Compute Unified Device Architecture (CUDA) based parallel computing infrastructure, by:
performing a block-wise speeded up robust features extraction process for each image partition;
performing a point matching process for each image partition;
using a random sample consensus (RANSAC) algorithm to remove outlier points from the plurality of image partitions; and
performing a transformation estimation process of the image partitions to generate block-wise homography matrices;
wherein each registration kernel is configured to have one cluster integrated with eight groups of four image partitions at a time instant.

15. The system of claim 14, wherein the mark setting kernels are configured for:
stitching portions of the registered image partitions based on the block-wise homography matrices generated from the transformation estimation process;
wherein a number of threads per block is consistent with available shared memory of the plurality of GPUs.

16. The system of claim 12, wherein the background generation kernels are configured for:

performing a background setting step for setting each image partition to a mask with zero pixel values, an image averaging step, and a background extraction step; and implementing a parallelized process based on the plurality of GPUs using CUDA data structure dim3.

17. The system of claim 12, wherein the foreground generation kernels are configured for:

performing a pixel value comparison step, a value assigning step, and a foreground extraction step;

implementing the Hyper-Q computation framework to enable multiple CPU cores to launch work on a single GPU simultaneously for increasing GPUs utilization and slashing CPU idle time; and introducing Grid Management Unit to create multiple hardware work queues to reduce a synchronization time.

18. The system of claim 12, wherein the classification kernels are configured for:

implementing histogram of oriented gradients to compute color gradients and obtain gradient magnitudes and orientations via convolution; and calculating probabilities or confidence levels of the multiple objects based on the gradient magnitudes and orientations.

19. The system of claim 12, wherein:

the classified plurality of objects are asynchronously transmitted from the multiple GPUs to the CPU host to reduce or eliminate a synchronization time.

20. The system of claim 12, wherein the CPU host is further configured for:

generating a graphical user interface through an open source computer vision library for monitoring the multiple objects on the visualization classification images in real-time.

* * * * *